Jan. 21, 1964  J. W. DRENNING  3,118,335
CUT OFF KNIFE SAFETY INTER-LOCK
Filed Aug. 29, 1960  3 Sheets-Sheet 1
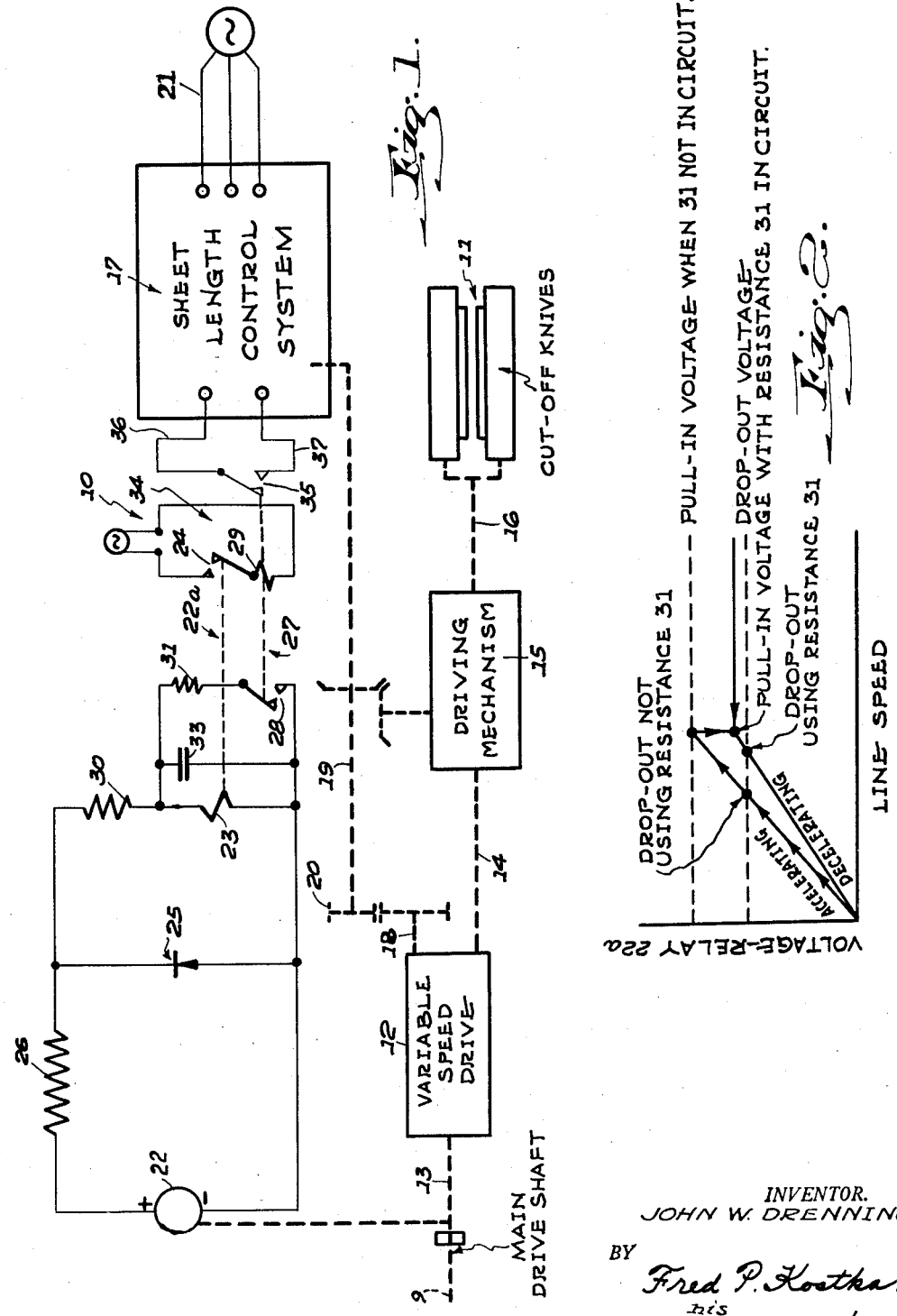
INVENTOR.
JOHN W. DRENNING.
BY
Fred P. Kostka.
his
ATTORNEY.

INVENTOR.
JOHN W. DRENNING.
BY Fred P. Kostka
his ATTORNEY.

Jan. 21, 1964   J. W. DRENNING   3,118,335
CUT OFF KNIFE SAFETY INTER-LOCK
Filed Aug. 29, 1960   3 Sheets-Sheet 3

INVENTOR.
JOHN W. DRENNING.
BY Fred P. Kostka.
his ATTORNEY 3,118,335
CUT OFF KNIFE SAFETY INTER-LOCK
John W. Drenning, Baltimore, Md., assignor to Koppers Company, Inc., a corporation of Delaware
Filed Aug. 29, 1960, Ser. No. 52,482
3 Claims. (Cl. 83—72)

This invention relates to corrugated paper machinery and more particularly, to the cut off mechanism employing a variable speed transmission and a novel arrangement for preventing adjustment of the variable speed transmission below a predetermined minimum speed.

In the typical mechanical variable speed transmission unit, damage results to the unit if speed ratio adjustments are made when the input shaft speed is below a predetermined minimum speed. Conventionally, speed ratio changes to the transmission are made by way of motor-driven members of which the motor may be energized by way of an automatic or semi-automatic control system. When such motor-driven members are employed with the control systems, it is essential that the motor or control system be rendered inoperative when the input speed of the variable speed transmission falls below the critical minimum level or when the input speed is at a standstill.

The problem of preventing damage to variable speed transmissions is particularly apparent in the cut off knife actuating mechanism employed in corrugating paper making machinery. These mechanisms conventionally employ a pair of rotating knives through which a continuous web of corrugated sheet passes and is severed into sheets of desired lengths. The speed of the knives is coordinated with the rate of feed of the paper thereto so that the selected or desired length of sheet is severed from the web. A mechanical variable speed transmission device is connected between the main drive shaft, which reflects directly the rate of feed of the moving web, and the rotating knives. A drive and adjusting mechanism is usually disposed between the variable speed transmission and the knives to provide for rapid acceleration or deceleration of the knives so that the speed of the knife is substantially equal to the linear speed of the web at the moment of cut off. In the above described system, it has been found advantageous to employ control systems with the variable speed transmission for the purpose of automatically or semi-automatically varying the speed ratio so that the desired length may be severed from the continuous web. One such control is disclosed in U.S. patent application Serial No. 705,605, filed September 27, 1957 and now abandoned, assigned to the assignee of the present invention.

The sheet length control system includes a motor or motors which are operatively connected by suitable linkage to the variable speed transmission so as to change the speed ratio of the input to output shafts thereof. The motors are actuated by suitable circuitry so as to correct for errors in sheet length and to provide for adjustment of the sheet length. The variable speed transmission is connected to the main gear train of the box making machine. Hence, when the machine is at a standstill or because of power failure or other difficulties so that the speed of the main gear train falls below the speed at which adjustments may be made to the variable speed drive, means must be provided for disconnecting the sheet length control system to prevent adjustment of the variable speed transmission device by the control.

It is accordingly an object of the present invention to provide a protective device in the form of a low line speed relay inter-lock system for energizing the system when the main drive shaft is operating at speeds above which damage occurs to the transmission and de-energizing the system when the shaft falls below the minimum speed.

Briefly, this is accomplished by providing means for generating a signal corresponding to the input speed of the variable speed transmission and voltage sensitive relays responsive to the signal voltage at or above the input speeds at which damage results to the variable speed transmission so that the relays are only closed at speeds exceeding the minimum speed, and providing a voltage regulating device which is operative to prevent burning out of the coils of the relay.

A voltage sensitive relay inherently has a differential between the pull-in and drop-out voltages on the relay of which the drop-out voltage is lower than the pull-in voltage. Under these conditions, it is apparent that adjustments may be made to the variable speed transmission at lower speeds when the input shaft or line speed of the main drive is decreasing. This condition is undesirable.

In accordance with the present invention, means are provided to minimize the difference by incorporating means for rendering the relay more sensitive to decreases in signal voltages corresponding to the minimum line or input speed of the mechanical transmission.

To prevent damage to the relays in accordance with the present invention, a voltage regulating device is employed with the relays to prevent excessive voltage from appearing on the coils. To this end there is employed a voltage regulating device operative to maintain the voltage on the relay coil substantially constant approximately at and above the minimum predetermined line or input speed of the variable speed transmission. One such voltage regulating device found to be particularly suitable is a silicon semi-conductor well-known in the art as a Zener diode. A characteristic of the Zener diode is that no matter what current passes through it when the voltage regulating current is impressed thereon, the voltage drop remains constant. This characteristic is of extreme usefulness in the relay system of the present invention.

When using a silicon semi-conductor, the voltage applied to the relay coils of a relay are maintained at or below the rated value regardless of the line speed.

In this connection, it is to be pointed out that the present invention employs a suitable signal generating device for sensing and generating a signal corresponding to the line or input speed of the variable speed transmission, hence in practice, the cut out relay must operate at some low value of line speed or input speed, or expressed otherwise at the value at which it is desired to connect or disconnect the control system from the variable speed transmission so that no adjustments may be made to the latter. This value of line speed produces a voltage signal which is approximately equal to the relay coil rating so as to insure proper relay closure. However, since the relay coil must also remain operative at maximum line speed, provision must be made for such an increase in load on the relay coil without destroying the latter as the signal voltage increases with an increase in line speed. When the Zener diode is employed as pointed out above, the voltage drop across the relay remains substantially constant no matter what the current so that a constant voltage passes through the relay and the latter is not subject to failure at the increased voltage signal resulting from increased line or input speed.

Further objects will hereinafter appear.

FIG. 1 is a schematic view of the relay system of the present invention as it is embodied in a cut off knife actuating and control system of a paper making machine.

FIG. 2 is a graph showing the points of pull-in and drop-out voltage of the relay system embodied by the present invention.

Figure 3:
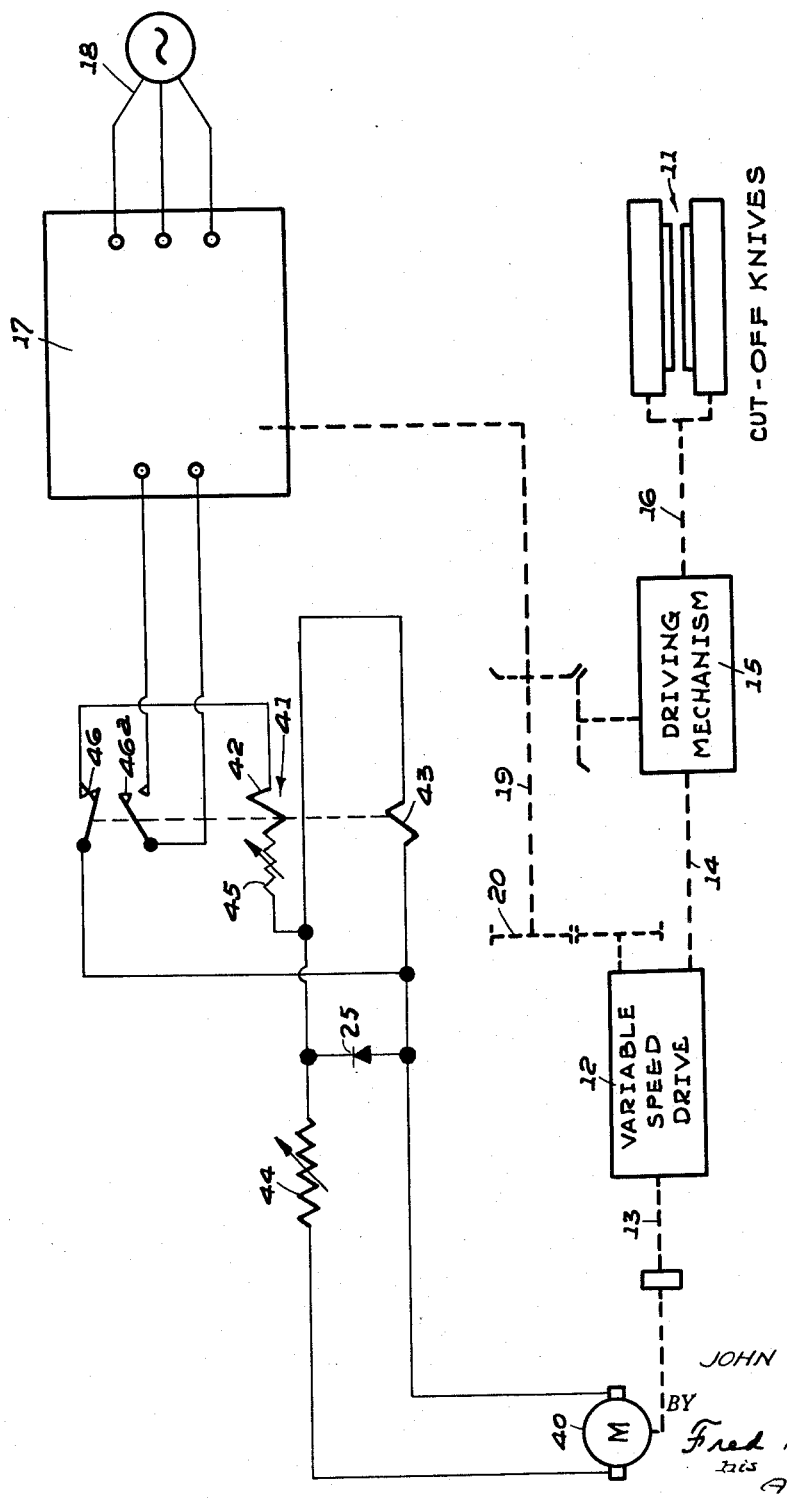
FIG. 3 is a schematic view of a second embodiment of a safety inter-lock embodying the present invention.

Referring now to FIG. 1, there is schematically illustrated a more or less typical cut off knife actuating system 10 of the type employed in the corrugated paper machinery field. The actuating system comprises generally a pair of rotary cut off knives 11 which are operative to periodically sever sheets of selected length from a continuously moving web of material, such as corrugated paper, fed thereto by feed rollers not shown. The feed rollers are actuated directly from the main drive shaft 9 so that the main drive shaft reflects the rate of feed of the continuously moving web being severed.

To adjust the sheet length being severed by the cut off knives 11, there is employed a variable speed transmission 12 of the mechanical type. This unit is typically a Reeves variable speed drive or a "PIV" manufactured by the Link Belt Company of Philadelphia, Pennsylvania. The input shaft 13 of the variable speed transmission 12 is coupled directly to the main drive shaft 9 and the output end thereof via output shaft 14 is connected to a driving mechanism 15 which is suitably coupled by linkages 16 to drive the cut off knives. The drive mechanism may be of the type generally disclosed in U.S. Patent No. 2,879,845, dated March 18, 1959, and may incorporate therein a means for accelerating and decelerating the rotary knives so that the speed of the knives at the moment of cut is substantially equal to the line speed or the rate of feed of the web material.

Adjustment of the variable speed transmission 12 to vary the ratio of the speed of the input shaft 13 with respect to the speed of the output shaft 14 and thereby the ratio of the web feed to the cut off knife so as to change the length of the sheet length being severed is accomplished by way of suitable gearing 18. The gearing 18 and accordingly the adjustment of the transmission 12 is connected to an automatic or semi-automatic sheet length control system 17 incorporating therein motors for driving a gear train 19 having a gear 20 meshing with the gearing 18. The sheet length control system 17 is connected to a suitable source of electrical power 21 and includes suitable circuitry for manually, semi-automatically or automatically adjusting motor driven linkage 19. The sheet length control system may be of the type in the before mentioned U.S. patent application Serial No. 705,605 which discloses generally a tachometer generator system associated with the input and output shafts 13 and 14 of the variable speed transmission so as to sense the speed ratio of the two and thereby the sheet length being severed. The tachometer generator system is connected with suitable circuitry for energizing the motor units (not shown) within the sheet length control so as to maintain a selected speed ratio of the input and output shafts 13 and 14 respectively and thereby achieve the desired length of sheet cut from the continuously moving web. As shown, the sheet length control gear train 19 is also connected with the driving mechanism 15 so as to adjust the linkages therein for accelerating and decelerating the cut off knife at the cut off point as more fully described in the above identified patent and applications.

As discussed hereinbefore, the mechanical variable speed transmission 12 is subject to mechanical failures in the event that the input shaft and output shaft speed ratio is adjusted when the input shaft or line speed thereof falls below a certain minimum value.

In accordance with the present invention, there is provided a safety inter-lock to prevent the sheet length control system from operating when the line speed of the input shaft of a variable speed transmission is below a predetermined minimum value so that the speed ratio of the input shaft and output shaft is not adjusted at or below said minimum line speed. As shown, the safety inter-lock system comprises generally a tachometer generator 22 for sensing the speed of the input or line speed of the shaft 13 and for developing a voltage signal corresponding to the speed of the shaft. Connected with the tachometer generator 22 is a voltage sensitive relay 22a having a coil 23 and contacts 24. The voltage sensitive relay is responsive to the voltage signal generated by the tachometer generator 22 so that when the latter develops a signal corresponding to the pull-in voltage of the relay, the relay is energized thereby to close the contacts 24.

The input speed at which the relay 22a closes is only a small fraction of the maximum running speed of the machine. With the tachometer generator as employed herein, the voltage signal increases as the line speed increases. This, of course, results in a corresponding increase in the signal voltage on the relay coils such that the relay may fail.

To preclude damage to the relay 22a by overloading, a silicon semi-conductor voltage regulator 25 which is characterized by its ability to maintain a substantially constant voltage drop no matter what current passes through it, is connected in parallel with the relay. One such voltage regulator found to be particularly suitable is a Zener diode. When the voltage signal applied to the voltage regulator 25 is at its Zener point, the voltage remains constant over an extremely wide range of current. The Zener diode is preferably selected so that its regulating voltage is approximately the same as the rated voltage of the coil so that the necesarily wide ranges of signal voltages extending from the minimum input speed to maximum line speed may be regulated. Connected in series to the positive side of the tachometer generator 22 and the Zener diode 25 is a resistor 26 which is selected so as to maintain the desired percentage of voltage regulation. A resistor 30 is connected in the circuit between Zener diode 25 and relay coil 23 so that after sufficient voltage has developed on the Zener diode 25 to cause the relay 22a to pull in, closing contact 28 and connecting resistor 31 in the circuit, an additional voltage drop will be created across resistor 30, due to the additional current required by the insertion of resistor 31 in the circuit, so as to reduce the current in the relay coil 23 to a new value which is just sufficient to retain the relay in the closed condition. Thereafter only a relatively small reduction in coil 23 current, which occurs with a relatively small reduction in line speed, is required to drop-out the relay 22a. To prevent chatter of the relay 22a, a condenser 33 may be provided.

From the foregoing description, it is readily apparent that the voltage signal corresponding to line speed, when the latter is at or above the minimum line speed permitting adjustment of the mechanical speed transmission 12, is regulated so as to deliver a substantially constant voltage to the coil of the relay 22a. The regulated voltage is substantially the same as the coil rating and closes the contacts 24 included in a relay circuit 34 which is connected to a sutiable source of power. Mounted in the relay circuit 34 is a coil 29 of a double contact relay 27 of which one set of contacts 28 are connected in parallel and across the coil 23 of the relay 22a and the other set of contacts 35 are connected across lines 36 and 37 connected to the sheet length control system 17. The lines 36 and 37 are connected with the sheet line control 17 so as to render it inoperative when the contacts 35 are open and operative when contacts 35 are closed. When the contacts 24 of the relay 22a are closed, the coil 29 is energized so as to close the contacts 28 and 35 thereby connecting the sheet length control system to the variable speed drive 12 whereby the latter may be automatically or semi-automatically controlled to vary the speed ratio of the input and output shafts 13 and 14.

Connected in parallel with the relay 22a is a resistance 31 which serves to reduce the differential between the pull-in and drop-out voltages of the relay. The resistance 31 is only in the circuit of the relay 22a when the contacts 28 and 35 are closed and the sheet length control 17 is energized to adjust the variable speed transmission so that it does not effect the pull-in voltage of the relay 22a. However, when connected in the circuit, the resistance lowers the voltage through the coil 23 to a value above the drop-out voltage of the relay 22a and sufficient to hold the contacts 24 closed. Hence, upon deceleration of the input or main shaft 13, a small change in signal voltage on the relay coil 23 reflecting such decelerations is operative to effect the drop-out of the relay 22a to open the contacts 24. Opening of the contacts 24 opens the relay circuit 34 and thereby the contacts 28 and 35 so as to de-energize the sheet length control system 17.

The relationship of the drop-out and pull-in voltages of the relay 27 with and without the resistance 31 is illustrated in FIG. 2.

Referring to FIGS. 3, 4, 5 and 6, there is illustrated a second embodiment of the invention wherein for purposes of convenience like parts have been identified alike. In the second embodiment of the invention, the main drive motor 40 driving the gear train of the main shaft 10 is employed as the voltage signal generating device. As the speed of the main driving motor 40 changes, the voltage across the armature of motor 40 correspondingly changes so that this voltage directly reflects the line or input speed of the variable speed transmission 12.

Connected across the armature of the motor 40 is a load resistor 44 and a voltage sensitive relay 41 having two coils 42 and 43 connected in parallel. The relay 42 is operative to energize and de-energize the sheet length control system 17 as more fully to be explained below.

The double coil relay 41 as in the first embodiment of the invention is subject to the inherent differential between the pull-in and drop-out voltages. To decrease this differential, there is connected to the coil 42 a variable resistor 45. In operation, when the signal voltage increases as the motor speed increases to the minimum speed at which adjustment may be made to the transmission 12, current flows through both of the coils 42 and 43 by way of the normally closed contacts 46. The variable resistor 45 is adjusted so that during this period of acceleration, the voltage drop across the coil correspondingly increases to a value between the difference in pull-in and drop-out voltage of the relay. When the voltage signal is equal to the pull-in voltage of relay 41, the contacts 46 are opened and the contacts 46a are closed so as to connect the sheet length control system 17 with the mechanical speed transmission 12. Upon opening the contacts 46, the net core ampere turns of the coils 42 and 43 are reduced so that only the ampere turns of the coils 43 are operative to hold the contacts 46a closed. As explained above, the voltage across the coil 43 is reduced by the voltage drop across the variable resistor 45 and coil 42. In this manner, when the input shaft decelerates below the minimum speed, only the difference in signal voltage between the reduced voltage across the coil 43 and the drop-out voltage of the relay 41 is required to open the contacts 46 so as to de-energize the sheet length control system 17. To preclude damage to the relay when the signal voltage increases with increases in line speed above the minimum, a Zener diode 25 is connected in the circuit in parallel with the relay 41.

While the voltage signal generating device in the second embodiment is shown as being the armature of the main motor drive 40, and as a tachometer generator 22 in the first embodiment, it is to be understood that either voltage signal generating device may be employed in both embodiments.

Figure 4:
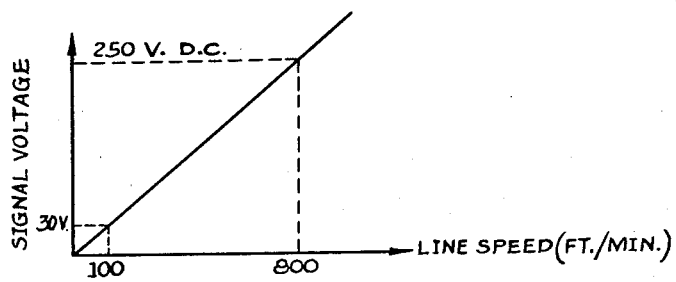
FIGS. 4, 5 and 6 are graphical illustrations of the operation of the relay system employed in FIG. 3.
Figure 5:
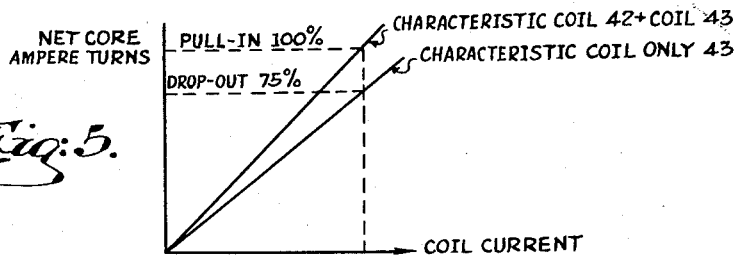
Figure 6:
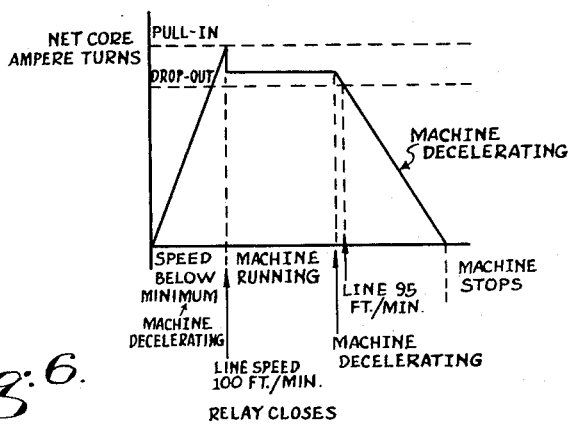

Referring now to FIGS. 4, 5 and 6, the curve of FIG. 4 illustrates how the signal voltage changes with line speed for a 250 voltage direct current system. Assume for example, actual conditions as shown on the curve of FIG. 4, the inter-lock or relay 41 must close at 30 volts and operate at voltages up to 250 volts. Assuming that the drop-out of the voltage is desired at 95% of the pull-in voltage, that is at 28.5 volts and assuming further relay characteristics as illustrated in FIGS. 5 and 6, as the signal voltage increases from zero, current flows through the load resistor R2 and coils 42 and 43. The Zener diode 25 draws practically no current since it has not reached its regulating voltage or Zener point. Resistor 45 is adjusted so that coil 42 draws about 20% of the total current in the two coils. When the coil voltage reaches four volts, the contacts 46 in series with coil 42 open and total current in coils 42 and 43 drops 20%. However, since a 25% drop is required to drop-out the relay, nothing happens. Now only a small change in signal voltage will be required to drop-out the relay. The actual differential is obtained by adjustment of the variable resistor 45. Should the signal voltage increase to its maximum value, the voltage on the relay will be limited to 5 volts by the Zener diode. When the voltage tries to increase, the Zener diode draws more current and thereby produces a larger voltage drop across the resistor 44. Thus, the signal voltage impressed on the relay 41 never exceeds the regulating voltage of the Zener diode.

What is claimed is:

1. A cut-off knife actuating system for selectively severing lengths of material from a continuously moving web thereof including a pair of co-acting cut-off knives, main drive means, a mechanical variable speed device, an input shaft connecting said variable speed device to said main drive means, an output shaft connecting said variable speed device to said cut-off knives, a sheet length control device for automatically modifying the speed ratio of said variable speed device as required to cause the length of material being severed by said cut-off knives to conform to a selected standard length and a safety inter-lock circuit for selectively enabling and disabling said sheet length control device at first and second predetermined speeds respectively of said main drive means, said safety inter-lock circuit comprising means for developing a signal voltage corresponding to the speed of said input shaft, relay means electrically connected to said signal voltage developing means, said relay means having a pull-in voltage rating corresponding substantially to the signal voltage developed at said first predetermined speed and a drop-out voltage rating corresponding substantially to the signal voltage developed at said second predetermined speed, means actuated by said relay means at said first predetermined speed for enabling said sheet length control device and actuated by said relay means at said second predetermined speed for disabling said sheet length control device, means electrically connected to said signal generating means for preventing the voltage across said relay means from exceeding a value substantially equal to the rated voltage thereof, means electrically connected to said relay means for reducing the voltage across said relay means to a value slightly greater than the drop-out voltage rating thereof and means interconnected with said enabling means for rendering said voltage reducing means operative while said sheet length control device is enabled.

2. A cut-off knife actuating system substantially as described in claim 1 wherein the voltage reducing means comprises a normally disconnected resistance connected in parallel across the relay means and contact means for connecting said resistance to said relay means when the signal voltage developed equals the pull-in voltage.

3. A cut-off knife actuating system for selectively severing lengths of material from a continuously moving web thereof including a pair of co-acting cut-off knives, a main drive shaft, a mechanical variable speed device, an input shaft connecting said variable speed device to said main drive shaft, an output shaft connecting said variable speed device to said cut-off knives, a sheet length control device for automatically modifying the speed ratio between said input and output shafts as required to cause the length of material being severed by said cut-off knives to conform to a selected standard length and a safety inter-lock circuit for selectively enabling and disabling said sheet length control device at first and second predetermined speeds respectively of said main drive shaft, said safety inter-lock circuit comprising means for developing a signal voltage corresponding to the speed of said input shaft, a relay electrically connected to said signal developing means, said relay having a pull-in voltage rating corresponding substantially to the signal voltage developed at said first predetermined speed and a drop-out voltage rating corresponding substantially to the signal voltage developed at said second predetermined speed, a first and second coil in said relay electrically connected in parallel, a resistance connected in series with said first coil, switch means actuated by said first and second coils at said first predetermined speed for disconnecting said first coil and said resistance from said second coil and substantially simultaneously enabling said sheet length control device, said second coil having a voltage thereacross slightly gerater than the drop-out voltage rating of said relay, said switch means being actuated by said second coil at said second predetermined speed for disabling said sheet length control device and reconnecting said first coil and said resistance in parallel with said second coil, means connected to said signal voltage developing means for preventing the voltage across said relay from exceeding a value substantially equal to the rated voltage thereof.

References Cited in the file of this patent

UNITED STATES PATENTS

| | | |
|---|---|---|
| 1,705,676 | Parsons | Mar. 19, 1929 |
| 1,991,083 | Dean | Feb. 12, 1935 |
| 2,364,716 | Huebner et al. | Dec. 12, 1944 |
| 2,460,055 | Wilson et al. | Jan. 25, 1949 |
| 2,499,805 | Wilson | Mar. 7, 1950 |
| 2,599,430 | Bererman | June 3, 1952 |
| 2,862,154 | Bradley | Nov. 25, 1958 |
| 3,024,388 | Blitchington | Mar. 6, 1962 |

FOREIGN PATENTS

| | | |
|---|---|---|
| 25,298 | Great Britain | Nov. 18, 1902 |
| 839,093 | Great Britain | June 29, 1960 |